May 3, 1938.                C. SAUZEDDE                2,116,216
                         BRAKE ADJUSTING MEANS
                         Filed July 8, 1935         2 Sheets-Sheet 1

INVENTOR.
Claude Sauzedde
ATTORNEYS

May 3, 1938.　　　　C. SAUZEDDE　　　　2,116,216

BRAKE ADJUSTING MEANS

Filed July 8, 1935　　　　2 Sheets-Sheet 2

INVENTOR.
Claude Sauzedde
BY
ATTORNEYS

Patented May 3, 1938

2,116,216

UNITED STATES PATENT OFFICE 2,116,216

BRAKE ADJUSTING MEANS

Claude Sauzedde, Detroit, Mich., assignor to Detroit Hydrostatic Brake Corporation, Detroit, Mich., a corporation of Michigan Application July 8, 1935, Serial No. 30,231

5 Claims. (Cl. 188—79.5)

This invention relates to brakes of the type actuated by fluid pressure derived from a source external to the wheel supporting the brakes. It pertains more particularly to means to be used in conjunction with such brakes for adjusting the brake shoes with respect to the surfaces with which they contact for the purpose of providing a desired clearance between the shoes and their contacting surfaces when the brakes are inoperative.

It is well known in the art and the industry to which this invention pertains that accurate adjustment of the brake shoes is an important consideration in the efficient operation of brakes and accordingly this invention has as its primary object to provide means whereby such adjustments may be easily made and accurately gauged.

Another object of the invention is to provide means for maintaining the shoes in their adjusted position after such adjustments have been made.

The present invention in its preferred form is used in combination with brake shoes of sectional segmental conical dual-faced type which are supported for wedging engagement with angularly disposed annular surfaces of brake drums on a vehicle wheel. The shoes are moved radially into contact with the brake drum surfaces by fluid pressure and when the fluid pressure is removed resiliently yieldable means moves the shoes out of contact with the drum surfaces. This invention provides means for limiting the movement of the shoes in a direction away from the drum surfaces, the means being manually adjustable so that the position the shoe takes, with respect to the drum surface, may be varied.

With the above and other ends in view the invention consists in matters hereinafter more particularly pointed out with reference to the accompanying drawings, in which Fig. 1 is a sectional view of a wheel and brake assembly;

Like characters of reference are employed throughout to designate corresponding parts.

Figure 1:
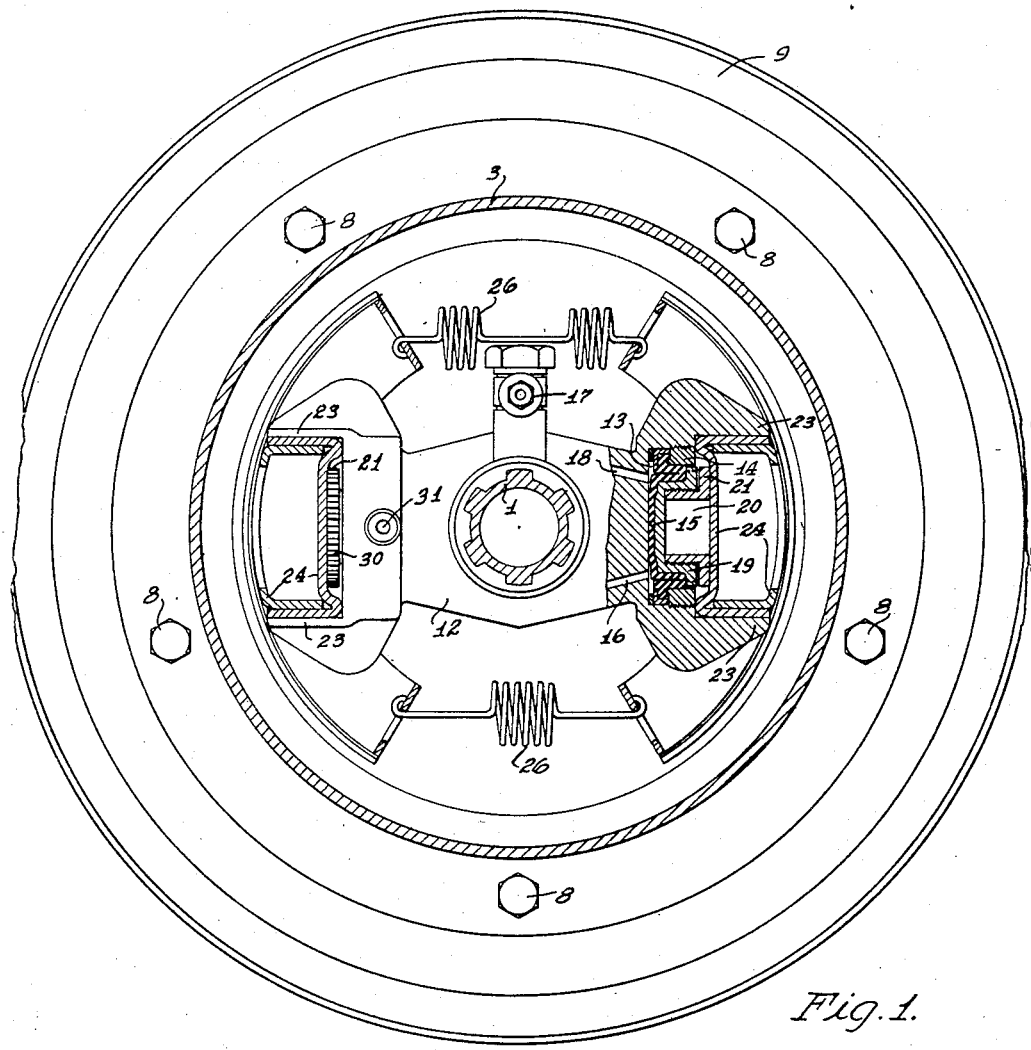
Figures 6, 7:
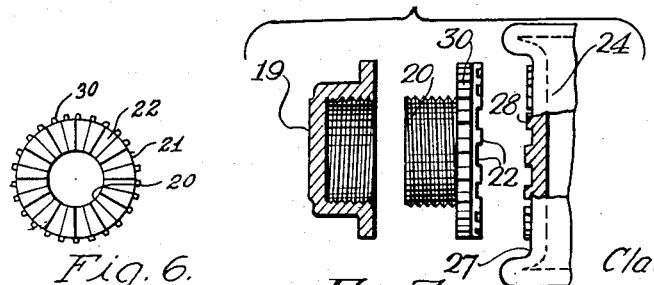
Fig. 6 is an elevation of the adjusting element.
Fig. 7 is an exploded detail view, partly in section and partly in elevation.
Figure 2:
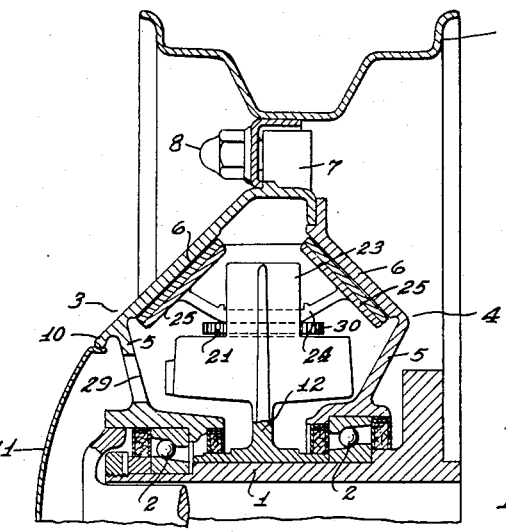
Fig. 2 is a fragmentary transverse cross section.
Figure 3:
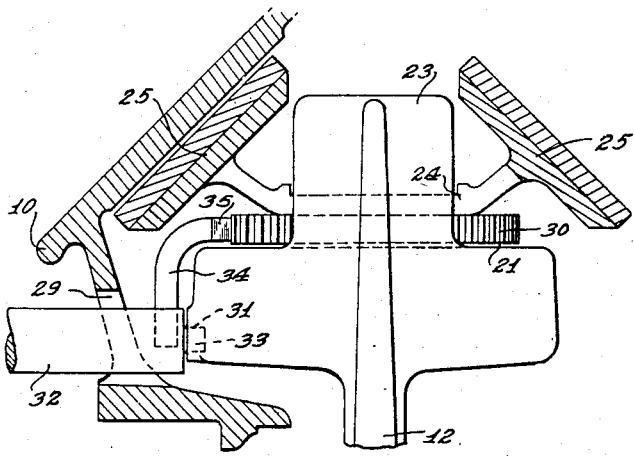
Figs. 3 and 4 are details illustrating the adjusting operation.
Figure 5:
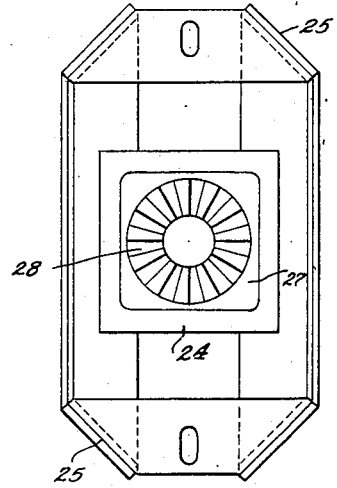
Fig. 5 is a rear elevation of a brake shoe unit.
Figure 4:
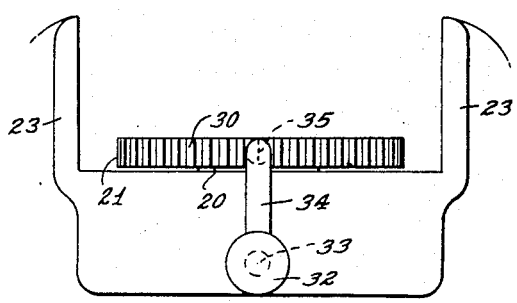

In the drawings the numeral 1 designates an axle having a wheel hub mounted on bearings 2 supported thereon. The wheel hub comprises front and rear side wall sections 3 and 4 respectively, the two sections each being formed with substantially radially extending portions 5 and with annular braking surfaces 6. The braking surfaces on the opposite hub sections are angularly formed whereby they co-operate to form a substantially conical seat for conical type brake shoes to be presently described. The two sections 3 and 4 are bolted together in the usual manner (not shown) and the section 3 is provided with radial lugs 7 receiving bolts 8 securing a tire supporting rim 9 thereto. The section 3 also has an extending portion 10 receiving and supporting a hub cap 11.

Splined on the axle 1 is a spider 12 which is designed for the support of two individual brake shoe elements but it will be understood that this particular disclosure is by way of example only and the invention is not restricted to any particular number of shoes. The spider is formed with two diametrically opposite annular internally threaded recesses 13, the inner end of the thread zones being spaced from the bottoms of the recesses. Received in the screwthreaded part of each recess 13 is an externally threaded ring 14 which secures a double cup flexible seal 15 in the bottom of each recess. Fluid under pressure from a source external to the hub is adapted to be supplied to the recesses 13, beneath the seals 15, through ports 16 in the spider. Each spider is further equipped with a bleeder valve 17 through which trapped air may be withdrawn from the recesses 13, the passage 18 in Fig. 1 illustrating the manner of connecting the recesses with the bleeder valve.

Received in the cupped part of each seal 15 is an internally screwthreaded annular body 19. The seal is preferably formed of a rubber composition and the body 19 is pressed thereinto. The fit between the body and the seal is therefore tight and frictionally resists rotation of the body with respect to the seal. As an additional precaution against rotation of the body with respect to the seal the external surface of the body 19 may be roughened or grooved or the two surfaces may be secured together by an adhesive.

Screwthreaded into the annular body 19 is a brake shoe adjusting element 20 comprising an externally threaded cylindrical body with a flange 21 providing an enlarged end bearing surface 22 which is provided with radially extending ratchet teeth.

The spider is provided with a pair of outwardly extending guide arms 23 adjacent to each recess 13 and slidably received in each set of arms is a bracket 24 supporting conical type brake shoes 25. The two sets of brake shoes thus supported are connected by tension springs 26 which function to move the shoes and brackets with respect to the guides, inwardly toward the axis of the spider, and to hold the brackets 24 in engagement with the bearing surfaces 22 on the adjustment elements 21. The inner ends 27 of the brackets 24 are provided with ratchet teeth 28 adapted to be interlocked with the ratchet teeth 22 by the action of the springs 26.

From the foregoing description it becomes apparent that when fluid under pressure is present in the recesses 13 that the seals 15, annular bodies 19, adjustment elements 20 and brackets 24 will be forced outwardly to move the shoes 25 into contact with the drum surfaces 6. When the fluid pressure is removed the springs 26 again move the shoes inwardly until the seals 15 seat on the bottoms of the annular recesses 13.

In order to provide for adjustment of the shoes with respect to the surfaces 6 the hub section 3 is provided with an aperture 29 and the flange 21 on each element 20 is provided with a series of teeth 30 on its periphery, the teeth being similar to gear teeth. In addition, the spider 12 is provided with bores 31 spaced from the axis thereof a distance corresponding to the distance the aperture 29 is spaced from the axis.

A wrench comprising a rod-like body 32 is provided with a pilot 33 on the end thereof and is provided with a radially extending arm 34 having its end 35 bent to extend in the direction of the axis of the body 32.

In order to adjust the brake shoes the end of the wrench is inserted through the aperture 29 and is placed so that the pilot 33 extends into the bore 31 and the bent end 35 extends into a groove between teeth on the flange 21. The wrench body 32 is then manually rotated with the result that the bent arm 34 imparts rotative movement to the adjustment element 20. With the annular body 19 stationary and in its fully retracted position shown in Fig. 1 rotation of the element 20 in one direction will move the same outwardly so that the shoes 25 are moved nearer to the surfaces 6. In order to adjust the shoes properly the shoes are moved into contact with the surfaces 6 and are then backed away. As the element 20 is rotated to back the shoes 25 away from the surfaces 6 the co-operating ratchets 22 and 28 provide a means for determining the distance the shoes are moved and thus the clearance between the shoes and the surfaces 6. As the element 20 is thus rotated the ratchets serve both as an audible indication of the amount of movement and means whereby the operator can feel the progressive steps in its rotative movement. As the ratchet teeth 22 are moved relative to the ratchet teeth 28 they set up a clicking sound and due to the pressure of the springs 26 the operator can feel the action of the teeth passing their respective high points and dropping into their respective low points, and each step in the movement results in a definite amount of movement of the shoes with respect to the surfaces 6. Therefore, if each step of the movement of the element 20 results in a definite amount of movement of the shoes, the ratchet device provides means for indicating the amount of clearance between the shoes and the surfaces 6. For example, if each step in the movement of the element 20 results in a thousandth of an inch movement of the shoes the operator is able to count the steps until the desired amount of clearance is provided.

The ratchet teeth 22 and 28 are preferably formed comparatively flat, for example, five thousandths of an inch. Thus they do not cause an excessive amount of movement of the shoes as the ratchets are relatively moved and yet they serve to maintain the adjusted relationship after it has been completed.

Although a specific embodiment of the invention has been illustrated and described it will be understood that various changes may be made within the scope of the appended claims without departing from the spirit of the invention, and such changes are contemplated.

What I claim is:—

1. A brake shoe adjusting device for a hydrostatic brake mechanism wherein brake shoes are moved radially into engagement with a drum by a movable element movable in response to fluid pressure and wherein the brake shoes are retracted from engagement with the drum by spring means, said adjusting device comprising a cylindrical body having a screwthreaded portion for engagement with the movable element of the brake mechanism, said cylindrical element having splines on the end thereof and a flange at the splined end formed with purchase points for engagement by a tool, and a member for supporting the brake shoe of the brake mechanism, said member having splines adapted to interlock with the splines on the end of said cylindrical element.

2. A brake shoe adjusting device for a hydrostatic brake mechanism wherein brake shoes are moved radially into engagement with a drum by a movable element movable in response to fluid pressure and wherein the brake shoes are retracted from engagement with the drum by spring means, said adjusting device comprising a cylindrical body having a screwthreaded portion for engagement with the movable element of the brake mechanism, said cylindrical element having splines on the end thereof and a flange at the splined end formed with purchase points for engagement by a tool, and a member for supporting the brake shoe of the brake mechanism, said member having splines adapted to interlock with the splines on the end of said cylindrical element, said splines being adapted to be held interlocked by the shoe retracting springs of the brake mechanism and having uniform spacing, the spacing of said splines having a definite relationship with the pitch of the threads on said cylindrical body whereby relative movement of the splines of one body past the other represents a definite amount of adjustment movement.

3. A brake shoe adjusting device for a hydrostatic brake mechanism wherein the brake shoes are moved radially into engagement with a drum by a movable element movable in response to fluid pressure and wherein the brake shoes are retracted from engagement with the drum by spring means, said adjusting device comprising a cylindrical body, a brake shoe supporting member, said cylindrical body having a screwthreaded end adapted to engage the movable element of the brake mechanism, said cylindrical body having purchase means thereon adapted to be engaged by a tool for rotating the same, and interlocking means on an end of said cylindrical body and on said shoe supporting member adapted to be held yieldably in interlocked relation by the shoe retracting springs, said interlocking means being uniformly spaced and having a definite relationship with the threads on said cylindrical body.

4. Adjustment means adapted to be mounted between a shoe and a movable element in a brake structure having a shoe, a drum adapted to be contacted by the shoe, a movable element adapted to move the shoe into contact with the drum, and resilient means for retracting the shoe from contact with the drum, said adjustment means comprising a screwthreaded member adapted to be mounted in the movable element, a non-rotatable member engaged by the end of said screwthreaded member and adapted to be moved thereby to transmit movement to the brake shoe, the contacting portions of said two members having splines radiating from a common axis, said splines being adapted to be held yieldably engaged by the shoe retracting means to prevent accidental rotation of said screwthreaded member.

5. Adjustment means adapted to be mounted between a shoe and a movable element in a brake structure having a shoe, a drum adapted to be contacted by the shoe, a movable element adapted to move the shoe into contact with the drum, and resilient means for retracting the shoe from contact with the drum, said adjustment means comprising a screwthreaded member adapted to be mounted in the movable element, a non-rotatable member engaged by the end of said screwthreaded member and adapted to be moved thereby to transmit movement to the brake shoe, the contacting portions of said two members having splines radiating from a common axis, said splines being adapted to be held yieldably engaged by the shoe retracting means to prevent accidental rotation of said screwthreaded member, said splines being proportioned with a definite relationship as to the pitch of the threads on said screwthreaded member, the screwthreaded member being adapted to be manually rotated, engagement and disengagement of said splines as a result of rotative movement of said screwthreaded member being adapted to cause an audible indication of the extent of such movement due to the yielding pressure of said shoe retracting means.

CLAUDE SAUZEDDE.